Aug. 18, 1964          J. MESSEAS          3,144,852
PORTABLE KNOCK-DOWN ANIMAL HOUSING STRUCTURE
Filed Aug. 14, 1963
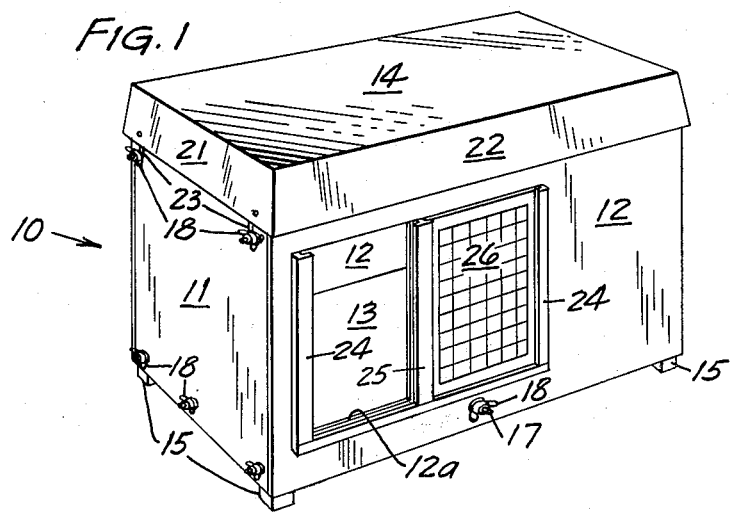
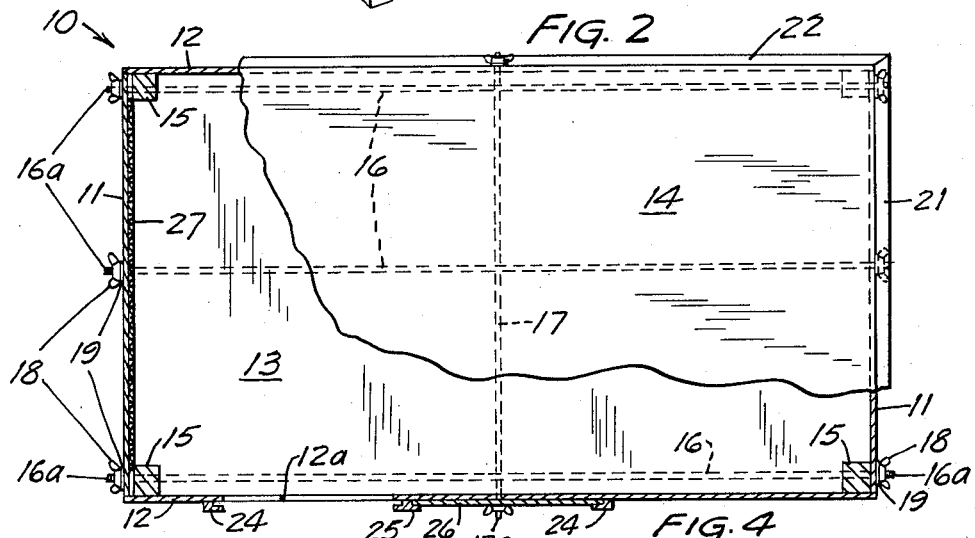
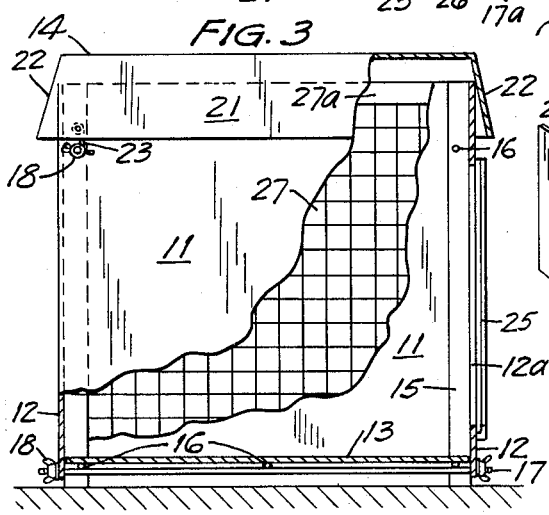
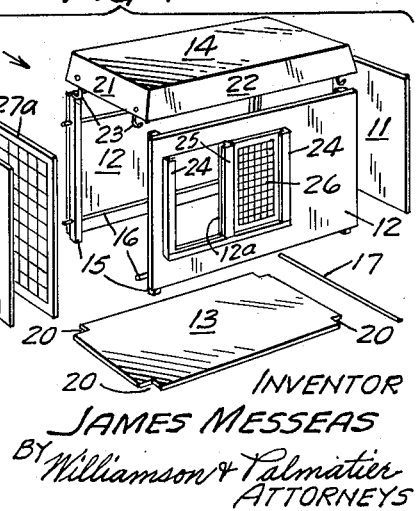
INVENTOR
JAMES MESSEAS
BY Williamson & Palmatier
ATTORNEYS United States Patent Office 3,144,852
Patented Aug. 18, 1964

3,144,852
PORTABLE KNOCK-DOWN ANIMAL
HOUSING STRUCTURE
James Messeas, Farmington, Minn.
(411 Pacific Ave., San Pedro, Calif.)
Filed Aug. 14, 1963, Ser. No. 302,083
3 Claims. (Cl. 119—19)

This invention relates to animal shelters and more particularly to a knock-down animal housing structure for housing dogs or the like and being capable of ready erection and disassembly.

An object of this invention is to provide a novel knock-down animal housing structure including opposed end and side walls clampingly interrelated by tie rod means, the latter defining a support for a bottom wall, and a top wall shaped and dimensioned to define a shallow receptacle when the housing structure is disassembled to receive the bottom, side and end walls therein.

Another object of this invention is to provide a novel and improved knock-down animal housing structure for use in housing dogs and the like, including opposed side walls having positioning elements thereon to permit proper and accurate positioning of the end walls in opposed spaced relation with respect to each other, with tie rod means releasably interrelating the walls and defining support means for a bottom wall, and a roof member flanged to grip and clamp the upper peripheral edges of the side and end walls in interrelated relation.

A further object of this invention is to provide a knock-down animal housing structure of the class described, and having a removable door for closing the conventional entranceway of the housing structure, and wherein a perforate wall member underlies at least one of the end walls whereby upon removal of the one end wall, the structure may be converted into a well ventilated transport cage.

These and other objects and advantages of my invention will more fully appear from the following description made in connection with the accompanying drawing, wherein like character references refer to the same or similar parts throughout the several views, and in which:

FIG. 1 is a perspective view of the invention in the erect condition;

FIG. 2 is a top plan view thereof on an enlarged scale with parts of the roof member broken away for clarity, and with other concealed parts thereof illustrated by dotted line configuration;

FIG. 3 is an end elevational view of the invention on the same scale as FIG. 2 and with certain parts of the end wall thereof broken away to better illustrate underlying parts; and FIG. 4 is an exploded perspective view on a reduced scale.

Referring now to the drawing and more specifically to FIG. 1 it will be seen that one embodiment of my novel knock-down animal housing structure, designated generally by the reference numeral 10, is thereshown. The housing structure 10 is comprised of a pair of substantially identical opposed end walls 11, side walls 12, a bottom wall 13 and a roof member 14. It will be seen that the housing structure 10 is of substantially rectangular configuration and that the side walls actually constitute the front and rear walls of the housing structure. The side, end and bottom walls which are of generally rectangular configuration are formed of suitable rigid material such as exterior plywood or the like and may be treated to withstand weathering.

The side, end and bottom walls are clampingly interrelated to permit ready disassembly thereof. To this end it will be seen that the respective end edges of the side walls 12, as best seen in FIG. 2, are provided with elongate positioning elements 15. These positioning elements, as shown, are formed of suitable rigid material such as wood and may be rigidly secured to the inner surface of the side walls by any conventional securing means such as glue, wood screws or the like. It will be seen that the positioning elements 15 are of generally rectangular configuration and are spaced inwardly and vertically oriented with respect to the end edges of the side members 12. It will also be noted that these positioning elements project downwardly beyond the lower edge of the side members to actually constitute supporting feet for the housing structure to space the bottom wall thereof above the surface of the ground.

In the assembled or erected condition, the end walls 11 will be positioned against the positioning elements 15 and will be clamped between the vertical marginal edges of the side walls. The means for releasably clamping the side and end walls in interengaging relation comprises a plurality of longitudinally extending tie rod elements 16 which extend between and through the respective end walls 11 and a transverse tie rod element 17 which extends between and through the respective side walls 12.

It will be seen that the longitudinal tie rod elements 16 are of a length slightly greater than the length of the housing structure and the transverse tie rod element is of a length slightly greater than the width of the housing structure. In the embodiment shown, five such longitudinally extending tie rod elements 16 are provided while only a single transversely extending tie rod element 17 is provided. It will be seen that the longitudinal tie rods 16 extend through suitable apertures in the positioning elements 15 of the side walls 12 and through suitable apertures in the end walls 11. One of the longitudinal tie rod elements 16 is centrally located with respect to the side edges of the end walls 11 and projects through apertures in the end walls adjacent the respective lower edges thereof. The remaining longitudinal tie rod elements 16 are located adjacent the respective corners of the end walls and it is pointed out that the lowermost of the longitudinal tie rod elements 16 are disposed in a single horizontal plane.

The transverse tie rod element 17, as shown, is centrally located with respect to the end walls 11 and projects through suitable apertures in the side walls 12 adjacent the lower marginal edges thereof. This transverse tie rod element 17, as best seen in FIG. 3, is disposed below the level of the horizontal plane in which the lowermost of the longitudinal tie rod elements 16 are disposed. Opposite ends of each of the longitudinal tie rod elements 16 are threaded as at 16a and opposite ends of the transverse tie rod element 17 are also threaded as at 17a. Suitable wing nut clamping elements 18 threadedly engage the respective ends of the tie rod elements 16 and 17 to permit clamping of the end and side walls in inter-engaging relation. Suitable washer or spacer elements 19 may be interposed between the wing nut clamping elements 18 and the associated walls to present an effective clamping surface. Thus it will be seen that when it is desirable to disassemble the end and side walls from clamped relation with respect to each other, it is merely necessary to remove the clamping elements 18 from threaded engagement with respect to one end of each of the longitudinal and transverse tie rod elements 16 and 17 respectively.

Referring now to FIGS. 2 and 4 it will be seen that the bottom wall 13 has a plurality of similar recesses 20 in the corners thereof for accommodating the positioning elements 15 therein. With this construction, the peripheral edges of the bottom wall 13 will be disposed in coplanar relation with respect to the exterior peripheral surface of the positioning elements 15. The end and side walls may therefore be clamped against the edges of the bottom wall 13 as well as the exterior surfaces of the positioning elements 15. It will also be noted that the bottom wall 13 will be supported upon the lowermost of the longitudinal tie rod elements 16 as best seen in FIG. 3. Thus the longitudinal tie rod elements 16 not only constitute means for maintaining the end and side walls in clamped inter-engaged relation, but also serve as means for positively supporting the bottom wall 13.

The roof member 14 is also constructed of a suitable rigid material and may be formed of a fiber-reinforced plastic, metal, wood or the like. This roof member 14 which is of generally rectangular configuration is provided with depending end flanges 21 and depending side flanges 22, these flanges being continuous with respect to each other. The side flanges 22, as best seen in FIG. 3, diverge downwardly with respect to each other and it is pointed out that the end flanges 21 also diverge downwardly with respect to each other. With this arrangement, it will be seen that when the roof member 14 is in the assembled condition, the peripheral flanges of the roof member are engaged at their inner surfaces intermediate their respective heights by the upper peripheral edges of the end and side walls 11 and 12 respectively. Thus the peripheral flanges of the roof member 14 exert a clamping effect on the upper marginal portions of the end and side walls of the housing structure. To this end it will be seen that the end edges of the side walls 12 will be disposed in substantially coplanar relation with respect to the exterior surface of the end walls 11.

In order to prevent accidental disengagement of the roof member 14 from assembled relation with respect to the end and side walls, a pair of hook-shaped retaining elements are provided for each of the end flanges 21. These hook-shaped retaining elements 23 are affixed to the end flanges and are engageable with the uppermost of the longitudinal tie rod elements 16. Therefore when the clamping elements 18 of these uppermost tie rod elements are clamped against the end walls 11, these hook-shaped retaining elements 23 will be interposed in clamped relation between the end walls and clamping elements.

The roof member 14 is shaped and dimensioned so that when disassembled and inverted, the roof member serves as a receptacle for receiving the end, side and bottom walls and the tie rods therein. Thus the entire housing structure 10 may be disassembled and nested in the roof member 14 to facilitate carrying or storage of this housing structure.

Referring again to FIG. 1 it will be seen that one of the side walls 12 has a generally rectangular shaped entranceway or access opening 12a therein. It will be noted that this entranceway is offset with respect to the center of this side wall member so that an animal within the housing structure will not be subjected to a draft. It will be appreciated that many conventional structures provide an entranceway in one of the end walls 11 or in some instances a centrally located entranceway in one of the side walls 12. This conventional type arrangement does not effectively shelter the dog against cold air drafts and is therefore uncomfortable to an animal. Although the entranceway 12a will be left unobstructed, means are also provided for closing this entranceway when the housing structure 10 is used as a cage to permit transportation of the animal. To this end the side wall 12 having the entranceway 12a therein is provided with a pair of vertically extending, elongate substantially identical guide elements 24. It will be noted that these guide elements 24 are of generally L-shaped cross sectional configuration and are secured to the inner wall surface of the side wall 12. A T-shaped door retaining guide element 25 is secured to the side wall 12 and is centrally located with respect to the guide elements 24. It will be noted that one of the guide elements 24 and the T-shaped guide element 25 are disposed in close proximity to the vertical edges of the entranceway 12a. The other of the guide elements 24 are spaced from the T-shaped guide element 25 a distance corresponding to the distance between the T-shaped guide element and the first mentioned guide elements 24. A rectangular shaped closure member or door 26 is provided and this closure member may be selectively positioned in supported relation between the T-shaped guide element 25 and one of the guide elements 24. Referring again to FIG. 2 it will be seen that the closure member 26 is positioned in the inoperative or stored position and will be retained in this stored position when the housing structure is used as an exterior or interior shelter for an animal. However, when the housing structure is to be used as a cage for transporting an animal, the closure member 26 will then be positioned in retained relation between the other of the guide elements 24 and the guide element 25 and will be disposed in obstructing relation with respect to the entranceway or doorway 12a. To this end it is pointed out that the closure member is formed of an open mesh material affixed to a rectangular frame to permit ventilation of the housing structure.

In order to provide adequate ventilation for the housing structure when the latter is used as a transport or shipping cage, a perforate or open mesh wall member 27 is interposed between one of the end walls 11 and the positioning elements 15. Thus it will be seen that the end wall associated with the perforated wall member 27 may be removed so that this perforated wall member 27 serves as the end wall for the housing structure. Thus additional ventilation is provided for the animal being transported. Since this perforated wall member 27 will be retained in place when the housing structure is assembled for use as a cage by means of the clamping elements 18, it will be seen that no additional retaining means are needed. To this end it will be seen that the perforated wall member 27 is comprised of a rectangular frame 27a corresponding in size to the size of the end wall 11, and this open frame will be suitably apertured to receive the ends of the longitudinal tie rod elements 16 therethrough. The rectangular frame 27a is preferably covered by a suitable open metallic mesh material, as best seen in FIG. 4, so that adequate ventilation is provided.

To assemble the housing structure for the purpose of providing an exterior or interior housing for an animal such as a dog or the like, the end walls are positioned against the positioning elements 15 of the side walls 12 and the longitudinal and transverse tie rod elements are thereafter extended to their associated apertures in the end and side walls. The bottom wall 13 is positioned upon the tie rod elements and the clamping elements along with the suitable washers or spacer elements 19 are positioned in place. The closure member or door 26 will then be positioned in the inoperative or stored relation and the roof 14 is thereafter mounted upon the peripheral edges of the end and side walls. It is pointed out that the clamping elements 18 for the uppermost of the longitudinal tie rod elements are not tightened into clamped relation against the end walls 11 until the hook shaped retaining elements are positioned in embracing relation with respect to the uppermost longitudinal tie rod elements. Thus the entire housing structure is then assembled for use.

The off-center entranceway, as pointed out above, serves to prevent exposure of the animal to wind, rain and the like when the structure is used as an exterior housing. The unique construction of the roof member 14 permits the end, side and bottom walls as well as the tie rod elements to be nested therein when the housing structure is disassembled. Although the peripheral flanges of the roof member serve to engage and clamp the peripheral edges of the end and side walls when the housing structure is in the erected or assembled condition, the interrelation of these flanges with the walls is such to permit ventilation thereat without excess drafts being produced. The flat roof also serves as a support surface elevated sufficiently above the level of the ground to facilitate grooming of an animal such as a dog. In the event that the roof member 14 is constructed of a liquid impervious material such as fiber-reinforced plastic, the roof may be removal and inverted to define a receptacle for bathing the animal. It will also be appreciated that the ease with which the roof may be removed facilitates cleaning of the inside of the housing structure.

When it is desirable to convert the housing structure into a cage for transporting an animal, it is merely necessary to replace one of the end walls 11 with the perforate wall member 27 and to position the closure member or door 26 in obstructing relation with respect to the entranceway 12a. Because of the smooth interior of the housing structure even when used as a transporting cage, there will be little tendency of the animal from being bruised during transportation thereof. Also by converting the housing structure into a transportation cage, animals such as dogs will not be frightened since the animal will be accustomed to the structure.

From the foregoing it will be seen that I have provided a novel knock-down portable animal housing structure which is capable of ready erection in a minimum of time and effort and which may be readily disassembled into a structure of relatively small compass to facilitate transportation and storage thereof.

It will also be seen from the preceding paragraphs that my novel animal housing structure may be readily converted into a transport cage for use in transporting animals such as hunting dogs or the like.

Thus it will be seen that I have provided a novel and improved animal housing structure which is not only of simple and inexpensive construction but one which functions in a more efficient manner than any heretofore known comparable devices.

It will of course be understood that various changes may be made in the form, details, arrangement and proportions of the various parts without departing from the scope of my invention.

What is claimed is:

1. A knock-down animal housing structure for housing dogs and the like and being capable of ready erection and disassembly, said structure comprising
   opposed upstanding end walls, opposed upstanding side walls, and a horizontal bottom wall,
   means releasably clamping said end walls in clamped relation against the end portions of said side walls comprising a plurality of elongate rod elements extending between and through at least two opposed walls,
   adjustable means engaging opposite ends of said rods and clampingly engaging the associated walls, said clamping means on at least one end of each of said rod elements being disengageable therefrom when said housing structure is disassembled,
   said bottom wall being supported on said rod elements,
   and a substantially flat roof member having continuous depending peripheral flanges integrally formed therewith and engaging the upper edges of said side and end walls to retain the same in interengaging relation, said roof member when detached and inverted being shaped and dimensioned to receive the disassembled side, end and bottom walls within the confines of said flanges and releasable locking means on said roof member and certain of said upstanding walls releasably clamping said roof member on said upstanding walls.

2. A knock-down animal housing structure for housing dogs and the like and being capable of ready erection and disassembly, said structure comprising
   opposed end walls, opposed side walls, and a bottom wall,
   means releasably clamping said ends walls in clamped relation against the end portions of said side walls comprising a plurality of elongate rod elements extending between and through at least two opposed walls,
   adjustable means engaging opposite ends of said rods and clampingly engaging the associated walls, said clamping means on at least one end of each of said rod elements being disengageable therefrom when said housing structure is disassembled,
   said bottom wall being supported on certain of said rod elements,
   and a substantially flat roof member having continuous depending peripheral flanges integrally formed therewith and engaging the upper edges of said side and end walls to retain the same and in interengaging relation,
   means on said roof member releasably engaging certain of said rod elements and being maintained in clamped relation therewith by said adjustable means,
   said roof member when detached and inverted being shaped and dimensioned to receive the disassembled side, and and bottom walls within the confines of said flanges.

3. A knock-down animal housing structure for housing dogs and the like and being capable of ready erection and disassembly, said structure comprising
   substantially rectangular opposed end walls, opposed side walls, and a bottom wall,
   a plurality of elongate rod elements extending between and through said end walls adjacent the marginal portions thereof and each rod element having threaded opposed ends,
   threaded clamping elements threadedly engaging opposite ends of each of said rods and clamping the end walls against the end portions of said side walls,
   certain of said elongate rod elements being disposed in a substantially horizontal plane adjacent the lower portion of said housing structure and defining a support for supporting said bottom wall thereupon,
   a substantially flat roof member having continuous depending side and end flanges integrally formed therewith and engaging the upper peripheral edges of said side and end walls to retain the same in interengaging relation,
   retaining elements on said roof member and depending therefrom and being engageable with certain of said rod elements to be releasably clamped thereagainst by said adjustable clamping elements,
   said roof member when detached and inverted being shaped and dimensioned to receive the disassembled side, end and bottom walls within the confines of said flanges.

References Cited in the file of this patent

UNITED STATES PATENTS

| | | |
|---|---|---|
| 1,013,233 | Stout et al. | Jan. 2, 1912 |
| 1,031,359 | Mehringer | July 2, 1912 |
| 1,215,740 | Steiner | Feb. 13, 1917 |
| 1,941,662 | Cunningham | Jan. 2, 1934 |
| 3,048,147 | McKean | Aug. 7, 1962 |